United States Patent [19]

Topcik et al.

[11] Patent Number: 4,867,923
[45] Date of Patent: Sep. 19, 1989

[54] PROCESS OF PRODUCING FOAMED PRODUCTS

[75] Inventors: Barry Topcik; Austin E. Barnabeo, both of Bridgewater, N.J.

[73] Assignee: Union Carbide Corporation, Danbury, Conn.

[21] Appl. No.: 684,687

[22] Filed: Dec. 21, 1984

[51] Int. Cl.$^4$ ............................................. C08J 9/10
[52] U.S. Cl. .................................... 264/54; 264/45.3; 264/321; 264/DIG. 18; 521/79; 521/81; 521/86; 521/96; 521/143; 521/154
[58] Field of Search ................... 521/154, 143, 79, 81, 521/86, 96; 264/54, 45.3, 321, DIG. 18

[56] References Cited

U.S. PATENT DOCUMENTS

| | | | |
|---|---|---|---|
| 3,017,371 | 1/1962 | Hohenberg et al. | 521/92 |
| 3,392,156 | 7/1968 | Donaldson | 521/149 |
| 3,608,006 | 9/1971 | Hosoda et al. | 521/89 |
| 3,651,183 | 3/1972 | Hosoda et al. | 528/85 |
| 4,160,072 | 7/1979 | Shinkai et al. | 521/86 |
| 4,252,906 | 2/1981 | Hosokawa et al. | 521/86 |
| 4,333,898 | 6/1982 | Schmidtchen | 521/82 |
| 4,413,066 | 11/1983 | Isaka et al. | 521/149 |

FOREIGN PATENT DOCUMENTS 5610082 1/1983 Japan.
1408154 10/1975 United Kingdom.

*Primary Examiner*—Morton Foelak
*Attorney, Agent, or Firm*—James C. Arvantes

[57] ABSTRACT

Process of producing a foamed product by forming a shaped article from a composition comprising a thermoplastic olefin polymer, a hydrolyzable, unsaturated silane, a gas generating compound and an organic peroxide in an amount of about 0.5 to about 2 percent by weight, and thereafter subjecting the shaped article to elevated temperatures to activate the gas generating compound and organic peroxide.

21 Claims, No Drawings

PROCESS OF PRODUCING FOAMED PRODUCTS

SUMMARY OF THE INVENTION

This invention relates to cured, thermoformable, silane containing olefin polymers produced by the polymerzation of an olefin with an unsaturated silane or the grafting of an unsaturated silane to an olefin polymer, accompanied by the perocide curing of the resultant polymer. The cured, olefin polymers of this invention have the dual capability of being thermoformed into shaped articles of desired configuration and subsequently water-cured to thermoset articles of a higher crosslinked density, having improved resistance to deformation at relatively high temperatures. Foamed articles, characterized by smooth outer skin and fine cells, can be produced by incorporating a gas generating compound into the basic composition of an olefin polymer, an unsaturated silane and an organic peroxide.

BACKGROUND OF THE INVENTION

The production of shaped articles from foamed olefin polymers involves a process which includes admixing an olefin polymer, an organic peroxide and a gas generating compound, extruding the resultant composition into a flat sheet and feeding the flat sheet through an oven which is at a temperature sufficiently high to activate the organic peroxide and gas generating compound. Activation of these materials, serves to foam and thermoset or cure the sheeted composition to a crosslinked density which allows the foamed sheet to be subsequently thermoformed into a shaped article of desired configuration. The density of the foamed sheet is controlled, by adjustment of process parameters, including amount of organic peroxide and gas generating compound, to a level such that the blowing agent gases generated are retained in the composition and are able to expand the composition to the maximum extent.

It has been found, however, that due to a relatively low crosslinked density, foamed articles produced by the process described, lack the dimensional stability required to be successfully used, for example, as liners for automobile trunks and the like wherein relatively high temperatures are encountered. In an attempt to improve the dimensional stability of foamed articles, it has been suggested to increase their crosslinked density by increasing the level of organic peroxide in the basic compositions. This expedient has not proved to be particularly effective as a higher level of organic peroxide tends to restrict the level of expansion of the compositions involved and renders the resultant foamed sheets more difficult to thermoform. Attempts to alleviate problems, caused by a higher level of organic peroxide, by adding more gas generating compound has only increased the cost of the overall process and final product.

DETAILED DESCRIPTION OF THE INVENTION

The present invention provides cured, thermoformable, olefin polymers having pendant, hydrolyzable silane moieties, which have the dual capability of being thermoformed into articles of desired configuration and subsequently water-cured to thermoset or cured articles of a higher crosslinked density, having improved resistivity to deformation at relatively high temperatures.

The basic compositions of this invention, from which the cured, thermoformable, silane modified olefin polymers are prepared, comprise an olefin or a thermoplastic olefin polymer, an unsaturated silane and an organic peroxide wherein the relative amounts of unsaturated silane and organic peroxide are such to produce water-curable, thermoformable, olefin polymers having pendant, hydrolyzable, silane moieties and having rheometer readings (ASTM D-2084-74T) of about 7 to about 30 lbs-inch, preferably about 10 to about 25 lbs-inch.

Basic compositions, as defined, are particularly useful in the production of foamed material which is characterized by a smooth outer skin and fine cells.

Illustrative of suitable thermoplastic olefin polymers for purposes of the present invention are normally solid homopolymers and interpolymers of monoolefins and diolefins.

Suitable monoolefins have the general formula:

$$C_\alpha H_{2\alpha} \qquad \text{FORMULA I}$$

wherein $\alpha$ has a value of at least 2. Exemplary of olefins falling within the scope of Formula I are: ethylene, propylene, butene-1, pentene-1, 4-methylpentene-1, hexene-1, heptene-1, octene-1 and the like.

Suitable diolefins have the general formula:

$$C_\beta H_{2\beta-2} \qquad \text{FORMULA II}$$

wherein $\beta$ has a value of at least 3. Exemplary of diolefins falling within the scope of Formula II are: 1,4-pentadiene, 1,3-hexadiene, 1,5-hexadiene, 1,4-octadiene, ethylidene norbornene and the like.

Illustrative of monorers which can be polymerized with monoolefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride; alkyl acrylates which fall within the scope of the following formula:

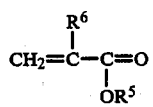

FORMULA III wherein $R^6$ is hydrogen or methyl and $R^5$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

It is to be understood that mixtures of reactants can be utilized to produce suitable polymers.

Desirable polymers are alkylene-alkyl acrylate copolymers generally having a density (ASTM D-1505 with conditioning as in ASTM D-147-72) of about 0.92 to about 0.94 and a melt index (ASTM D-1238 at 44 psi tested pressure) of about 0.1 to about 500 decigrams per minute. These copolymers generally have about 1 to about 50 percent by weight combined alkyl acrylate, preferably about 2 to about 20 percent by weight combined alkyl acrylate.

Preferred polymers are ethylene-propylene copolymers, ethylene-butene copolymers, ethylene-hexene copolymers and the like produced under low pressures on the order of about 15 to 300 psi.

Particularly preferred polymers have densities (ASTM D-1505) of about 0.850 to about 0.970, preferably about 0.875 to about 0.930. These polymers can be prepared by reacting a mixture containing about tob 50 about 99.9 mole percent, preferably about 75 to about 96 mole percent ethylene and from about 0.1 to about 50 mole percent and preferably about 4 to about 25 mole percent of at least one $C_3$ to $C_8$ alpha olefins previously described.

Olefins, suitable for purposes of this invention, are the monoolefins previously described.

Suitable unsaturated silane reactants for purposes of this invention have the general formula:

FORMULA IV wherein A is an unsaturated hydrocarbon radical or an unsaturated hydrocarbonyloxy radical and wherein other variables are as defined below.

Particularly desirable unsaturated silanes fall within the scope of Formula V and Formula VI.

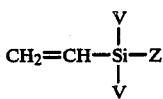

FORMULA V wherein each V can be hydrogen, a hydrocarbon radical or a hydrolyzable group and Z is a hydrolyzable group.

Illustrative of suitable hydrocarbon radicals or hydrolyzable groups for V are alkyl radicals having 1 to 18 carbon atoms inclusive, preferably 1 to 6 carbon atoms inclusive such as methyl, ethyl, n-propyl, isopropyl, n-butyl, n-hexyl and the like; alkoxy radicals having 1 to 18 carbon atoms inclusive, preferably 1 to 8 carbon atoms inclusive, such as methoxy, ethoxy, propoxy, hexoxy, octoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z, as stated, is a hydrolyzable group among which can be noted alkoxy radicals as previously described for V or oxyaryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill, patented Oct. 29, 1968.

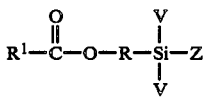

FORMULA VI wherein $R^1$ is an unsaturated monovalent hydrocarbon radical having a maximum of 18 carbon atoms as for example alkylene radicals having 2 to 18 carbon atoms inclusive, preferably 2 to 4 carbon atoms inclusive such as ethylene, propylene, isobutylene and the like; R is a hydrocarbon radical or an oxy substituted hydrocarbon radical, and V and Z are as previously defined.

Illustrative of suitable radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methyloxymethyl, methyloxypropyl, ethyloxyethyl, ethyloxypropyl, propyloxypropyl, propyloxybutyl, propyloxyhexyl and the like.

Among suitable silanes falling within the scope of Formulae IV-VI can be noted vinyltrimethoxy silane, vinyltriethoxy silane, vinyltris-(n-propoxy) silane, vinylbis-(methoxy)methyl silane, vinylbis-(ethoxy)methyl silane, vinylbis-(n-propoxy)methyl silane, vinylmethoxydimethyl silane, vinylethoxydimethyl silane, allyltrimethoxy silane as well as the following silanes:

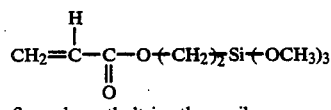

β-acryloxyethyltrimethoxy silane

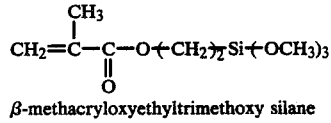

β-methacryloxyethyltrimethoxy silane

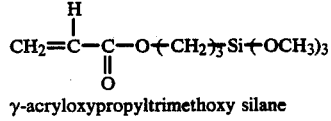

γ-acryloxypropyltrimethoxy silane

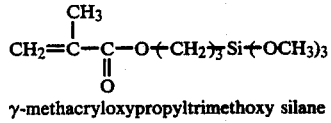

γ-methacryloxypropyltrimethoxy silane

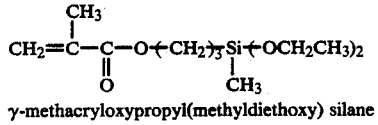

γ-methacryloxypropyl(methyldiethoxy) silane

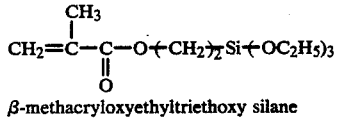

β-methacryloxyethyltriethoxy silane

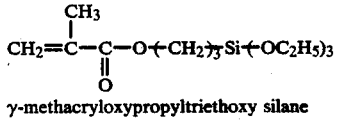

γ-methacryloxypropyltriethoxy silane

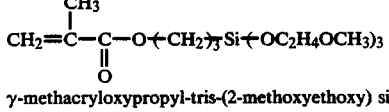

γ-methacryloxypropyl-tris-(2-methoxyethoxy) silane

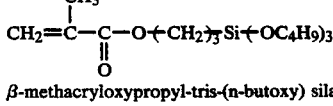

β-methacryloxypropyl-tris-(n-butoxy) silane

-continued

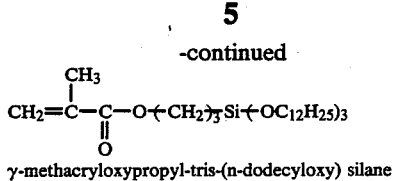

γ-methacryloxypropyl-tris-(n-dodecyloxy) silane

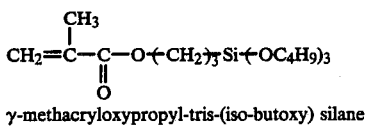

γ-methacryloxypropyl-tris-(iso-butoxy) silane

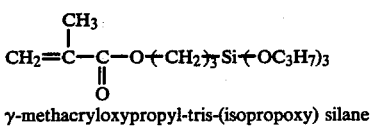

γ-methacryloxypropyl-tris-(isopropoxy) silane

Illustrative of suitable organic peroxides are the polymer hydroperoxides, such as polyethylene hydroperoxide, and other such polymer hydroperoxides, as for example are disclosed in U.S. Pat. No. 2,911,398, issued Nov. 3, 1959 to Edwin J. Vandenberg; the perester peroxides, such as t-butyl peracetate, t-butyl peroxyisobutyrate, di-t-butyl diperphthalate, t-butyl perbenzoate, di-t-butyl dipermethyl malonate, di-t-amyl dipermethyl malonate, di-t-hexyl diperethyl succinate, di-t-hexyl dipergluturate, di-t-amyl dipersuccinate and the like, for instance as are disclosed in U.S. Pat. Nos. 2,763,635, issued Sept. 18, 1956 to Charles M. Lucher et al, and as are disclosed in 2,698,863, issued Jan. 4, 1955 to Frank H. Dickey; diacyl aromatic peroxides exemplary of which are the peroxides having the formula:

$(R'CO)_2O_2$ wherein R' is an aryl radical, such as benzoyl peroxide, 2,4-dichlorobenzoyl peroxide, p-chlorobenzoyl peroxide and the like; diacryl aliphatic peroxides, such as those having the formula:

$(R_2CO)_2O_2$ wherein $R_2$ is an alkyl group, as for example, acetyl peroxide, caprylyl peroxide, myristoyl peroxide, lauroyl peroxide and the like; dibasic acid peroxides, such as succinic acid peroxide; the ketone peroxides, such as methyl ethyl ketone peroxide, cyclohexanone peroxide and the like; the aldehyde peroxides, such as hydroheptyl peroxide and the like; peroxides having the formula:

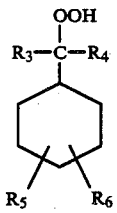

wherein $R_3$ and $R_4$ are alkyl groups, $R_5$ is dialkyl methyl or trialkyl methyl; with the alkyl group in each case containing a maximum of 8 carbon atoms and $R_6$ is hydrogen or an alkyl group containing a maximum of 8 carbon atoms such as 1,1-dimethyl-1-(isopropyl cyclohexyl)methyl hydroperoxide, 1,1-dimethyl-1-(diisopropyl cyclohexyl)methyl hydroperoxide and the like as are further disclosed in U.S. Pat. No. 2,776,954, issued Jan. 8, 1957 to Milton A. Taves; di(aralkyl) peroxides of the formula:

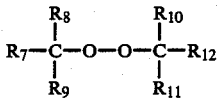

wherein $R_7$ is aryl, $R_8$, $R_9$, $R_{10}$ and $R_{11}$ are hydrogen or alkyl groups of less than 4 carbon atoms and $R_{12}$ is aryl, such as dibenzyl peroxide, bis-(α-methylbenzyl)peroxide, bis-(α,α-dimethylbenzylperoxide (di-α-cumylperoxide), bis-(α-propylbenzyl)peroxide, benzyl-(α-methylbenzyl)peroxide, benzyl-(α-methyl-p-methylbenzyl)peroxide, benzyl-(α-methyl-p-isopropylbenzyl)peroxide and the like as are further disclosed in U.S. Pat. No. 2,826,570, issued Mar. 11, 1958 to Reginald W. Ivett; hydroperoxides, such as 2,5-dimethylhexane-2,5-dihydroperoxide, p-menthane hydroperoxide, t-butyl-hydroperoxide, benzoin peroxide and the like; di-tertiary alkyl peroxides such as di-t-butyl peroxide, 2,5-bis-(tert-butylperoxy)-2,5-dimethylhexane and the like.

Gas generating compounds are well known in the art and include azodicarbonamide, dinitrosopentamethylenetetramine, p,p'-oxybis(benzenesulfonylhydrazide), N,N'-dimethyl-N,N'-dinitrosoterephthalamide, p-toluene sulfonyl semicarbazide and the like.

Compositions comprising an olefin or a thermoplastic olefin polymer, an unsaturated silane, an organic peroxide and if desired, a gas generating compound and other additives are formulated by simply admixing the materials in a suitable vessel such as a Brabender mixer, a two roll mill or a Banbury mixer.

The amount of unsaturated silane used in the formulation described is sufficient to produce water-curable olefin polymers having pendant, hydrolyzable silane moieties. The actual amount of unsaturated silane used is about 0.5 to about 10 percent by weight, preferably about 1.0 to about 5 percent by weight based on the weight of the olefin monomer or thermoplastic olefin polymer charged.

The organic peroxide is used in amounts sufficient to effect a reaction between the olefin or thermoplastic olefin polymer and the unsaturated silane and to effect a peroxide cure of the resultant polymer to the rheometer readings previously described. The actual amount of organic peroxide used is about 0.05 to about 5 percent by weight, preferably about 0.5 to about 2 percent by weight based on the amount of olefin monomer or thermoplastic olefin polymer charged.

As to the blowing agent, it is used in amounts, generally of about 2 to about 40 percent by weight, based on the weight of the silane containing polymer.

The basic compositions of this invention are heated to temperatures sufficiently high to activate the organic peroxide which in turn serves to effect the reaction of the unsaturated silane with the olefin monomer or thermoplastic olefin polymer and to peroxide cure the resultant silane containing polymer to the rheometer readings described. As a rule, temperatures on the order of about 100° C. to about 200° C. are employed.

To the basic compositions can be added various additives, as previously discussed, the effects of which are manifested in the final product. These additives include fillers among which can be mentioned carbon black, clay, talc, talc coated with a metal salt of a fatty acid having 8 to 20 carbon atoms, calcium silicate, calcium carbonate, silica, aluminum hydroxide and the like, silanes such as vinyl-tris (2-methoxyethoxy) other like surface treating agents, flame retardants such as tricresyl phosphate, triphenyl phosphate, halogen containing flame retardants such as decabromodiphenyl oxide, ethylene(bis-tetrabromophthalimide), chlorinated polyethylene, polyvinyl chloride and halogenated paraffin waxes, alone or in admixture with inorganic compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate. Other additives such as smoke suppressants illustrated by zinc borate, molybdenum oxide and the like, crosslinking boosters or peroxide coagents such as silane crosslinking boosters described in U.S. Pat. No. 4,426,480, issued Jan. 17, 1984, acrylate monomers such as trimethylol propane triacrylate, triallyl cyanurate, zinc dimethacrylate, zinc diacrylate, N,N'-m-phenylenedimaleimide and the like.

Water-curing of the polymers of this invention and compositions based thereon is effected at temperatures on the order of about 70° C. to about 100° C. The actual time of the curing cycle will depend, in part, upon the temperatures employed as well as the thickness of the material being crosslinked. Crosslinking can be accelerated by the use of a silanol condensation catalyst. Among suitable silanol condensation catalysts are metal carboxylates such as dibutyltin dilaurate, stannous acetate, stannous octoate, lead naphthenate, zinc octoate, iron-2-ethyl hexoate and the like, and organo titanates such as tetramethyl titanate, tetraethyl titanate, tetraisopropyl titanate and the like.

In the following examples, which are illustrative of the present invention, compositions and silane containing polymers of Table 1 were prepared as follows:

A thermoplastic olefin polymer was charged into a Brabender mixer which had been preheated to a temperature of about 100° C. to 130° C. The thermoplastic olefin polymer was fluxed and to the fluxed polymer there was then added unsaturated silane, organic peroxide and desired additives, with the organic peroxide added last. The materials were mixed to a homogeneous composition, the composition removed from the Brabender and pelletized by passage through a pelletizing extruder. The pelletized composition was fed to a press and molded into sheets 3 inches by 7 inches by 0.075 inch in thickness at a temperature below the activation temperature of the organic peroxide.

Initial rheometer determinations were made by cutting standard test specimens from the molded sheets and placing the test specimens in a rheometer, operating at a temperature of 180° C., for 12 minutes and making rheometer determinations at the end of the 12 minute period. During this period of time the organic peroxide was activated with the result that the unsaturated silane grafted to the thermoplastic olefin polymer and the resultant polymer peroxide cured to a rheometer reading of about 7 to about 30 lbs-inch.

Initial rheometer determinations were also made by placing sheets described in a press, which was at a temperature of 180° C., for 15 minutes to activate the organic peroxide with the result that the unsaturated silane grafted to the thermoplastic olefin polymer and the resultant polymer peroxide cured, cutting test specimens from the sheets, placing the test specimens in a rheometer which was operating at a temperature of 180° C. and making rheometer determinations.

Final rheometer determinations were made by placing sheets described in a press, which was at a temperature of 180° C., for 15 minutes, to activate the peroxide, removing the sheets from the press after the 15 minute period, placing the sheets in a water bath, which was at a temperature of 70° C., for 16 hours, removing the sheets from the water bath, cutting test specimens therefrom and making rheometer determinations in a rheometer operating at a temperature of 180° C.

The ethylene-ethyl acrylate copolymer noted in the examples and controls contained about 18 percent by weight combined ethyl acrylate.

The polyethylene noted in the examples and controls had a melt index of about 2.

Amounts noted in the tables are in parts by weight.

TABLE 1

| | Control 1 | Ex. 1 | Ex. 2 | Control 2 | Ex. 3 | Ex. 4 | Control 3 | Ex. 5 | Ex. 6 | Control 4 | Ex. 7 | Ex. 8 | Ex. 9 |
|---|---|---|---|---|---|---|---|---|---|---|---|---|---|
| Formulation | | | | | | | | | | | | | |
| Ethylene-ethyl acrylate copolymer | 100 | 100 | 100 | 100 | 100 | 100 | 100 | 100 | 100 | — | — | — | — |
| Polyethylene | — | — | — | — | — | — | — | — | — | 100 | 100 | 100 | 100 |
| Vinyltris (2-ethylhexoxy) silane | — | 2 | 4 | — | 2 | 4 | — | — | — | — | 4 | 4 | 4 |
| Vinyltriethoxy silane | — | — | — | — | — | — | — | 4 | 4 | — | — | — | — |
| Di-β-cumyl peroxide | 1 | 1 | 1 | 1 | 1 | 1 | 1 | 1 | 1 | 1 | 1 | 1 | 1 |
| Tetraethyl titanate | — | — | — | 2 | 2 | 4 | — | — | — | — | 2 | 4 | 4 |
| Dibutyltin dilaurate | — | — | — | — | — | — | — | — | 0.03 | — | — | — | 0.03 |
| Rheometer - lbs-inch | | | | | | | | | | | | | |
| Initial | | | | | | | | | | | | | |
| reacted and cured in rheometer | 24 | 21 | 20 | 14 | 13 | 7 | 24 | 20 | 27 | 20 | 15 | 13 | 12 |
| reacted and cured in press | — | — | — | 20 | 15 | 12 | 25 | 22 | 26 | 19 | 16 | 14 | 14 |
| Final | — | — | — | — | 31 | 39 | — | 21 | 39 | — | 38 | 42 | 44 |

The improved resistance to deformation of the silane containing olefin polymers of this invention is evidenced by the data set forth in Table 2 below, wherein sheets 0.020 inch thick, produced from the compositions of Control 4, Example 8 and Example 9 were tested for one percent secant modulus according to the test procedure described in Polymer-Polymer Miscibility, published by Academic Press, 1979, pages 126-127, Olagake Olebesi et al. Rheometer readings of the sheets tested are set forth in Table 1 as "Final" readings.

TABLE 2

| One Percent Secant | Temperature °C. | | |
|---|---|---|---|
| Modulus | Control 4 | Example 8 | Example 9 |
| 1000 psi | 66 | 69 | 67 |
| 100 psi | 95 | 105 | 100 |
| 10 psi | 180 | >220 | 210 |

Foams were prepared using compositions, the formulation of which are set forth in Table 3, by fluxing the components, as previously described, pelletizing the fluxed compositions, forming the compositions into sheets at temperatures of about 130° C., and passing the sheeted compositions into an oven set at a temperature of about 175° C. to about 22° C. to crosslink and expand the sheeted compositions.

TABLE 3

| Formulation | Control 5 | Example 10 | Example 11 | Example 12 | Example 13 |
|---|---|---|---|---|---|
| Ethylene-ethyl acrylate* copolymer | 87.5 | 87.5 | 88.75 | — | — |
| Polyethylene* | — | — | — | 88.75 | 78.75 |
| Di-α-cumyl peroxide | 1.0 | 1.0 | 1.0 | 1.0 | 1.0 |
| Blowing agent** composition | 30.0 | 30.0 | 30.0 | 30.0 | 30.0 |
| Zinc stearate (lubricant) | 1.0 | 1.0 | 1.0 | 1.0 | 1.0 |
| Polymerized 1,2-dihydro-3,4,5-trimethyl quinoline (antioxidant) | 0.25 | 0.25 | 0.25 | 0.25 | 0.25 |
| Vinyltriethoxy silane | — | 4.0 | — | — | — |
| Vinyltris(2-ethylhexoxy)-silane | — | — | 4.0 | 4.0 | 4.0 |
| Dibutyltin dilaurate | — | 0.05 | 0.03 | 0.03 | 0.03 |
| Trimethylol propane triacrylate | — | — | 1.0 | 1.0 | 1.0 |
| p,p'-oxybis(benzene-sulfonyl hydrazide) | — | — | 2.0 | 2.0 | 2.0 |
| Ethylene-propylene-diene rubber | — | — | — | — | 10 |
| Percent Decalin Extractables (ASTM-D-2765) | | | | | |
| Foamed sheet as prepared | 63.5 | 51.5 | — | — | — |
| Foamed sheet - immersed in 70° C. water bath for 16 hours | — | 40.5 | — | — | — |

*same polymers as described in Table 1
**composition was made up of ethylene-ethyl acrylate copolymer - 12.5 parts by weight, azodicarbonamide - 15 parts by weight, zinc oxide, 2.5 parts by weight Foams of Examples 10-13 were characterized by fine cells and smooth outer skin. These foams could be thermoformed and water-cured to "fixed" or "set" articles, having improved resistance to deformation at elevated temperatures.

Foam of Control 5 could be thermoformed but not water-cured. Also, this foam was subject to excessive shrinkage at elevated temperatures.

What is claimed is:

1. A process of producing a foamed product which comprises molding a composition comprising a thermoplastic, olefin polymer, a hydrolyzable, unsaturated silane, a gas generating compound and an organic peroxide in an amount of about 0.5 to about 2 percent by weight, based on the weight of the thermoplastic olefin polymer, into a sheet at a temperature below the activation temperature of the gas generating compound and the organic peroxide, removing the sheet from the mold and heating the sheet to a temperature sufficiently high to activate the gas generating compound and the organic peroxide with the result that the thermoplastic olefin polymer peroxide cures, reacts with the hydrolyzable, unsaturated silane to form a hydrolyzable, silane modified polymer and the molded sheet expands to a foamed product.

2. A process as defined in claim 1 wherein the foamed product is subsequently thermoformed into a shaped article and the shaped article water cured.

3. A process as defined in claim 1 wherein the unsaturated silane has the formula:

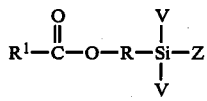

wherein $R^1$ is an unsaturated movovalent hydrocarbon radical having a maximum of 18 carbon atoms, R is a hydrocarbon radical or an oxy substitute hydrocarbon radical, each V is hydrogen, a hydrocarbon radical or a hydrolyzable group and Z is a hydrolyzable group.

4. A process as defined in claim 3 wherein R is an alkylene radical having 1 to 18 carbon atoms inclusive and each V and Z are alkoxy radicals having 1 to 18 carbon atoms inclusive.

5. A process as defined in claim 1 wherein the thermoplastic olefin polymer is polyethylene.

6. A process as defined in claim 1 wherein the thermoplastic olefin polymer is a polymer of ethylene and at least one $C_3$ to $C_8$ alpha olefin.

7. A process as defined in claim 1 wherein the thermoplastic olefin polymer is an alkylene-alkyl acrylate polymer.

8. A process as defined in claim 7 wherein the alkylene-alkyl acrylate polymer is an ethylene-alkyl acrylate polymer.

9. A process as defined in claim 1 wherein the unsaturated silane is present in an amount of about 0.5 to about 10 percent by weight based on the weight of the thermoplastic olefin polymer.

10. A process as defined in claim 1 wherein the unsaturated silane is present in an amount of about 1.0 to about 5 percent by weight based on the weight of the thermoplastic olefin polymer.

11. A process as defined in claim 1 wherein the olefin polymer is polyethylene and the unsaturated silane is vinyltriethoxy silane or vinyltris-(2-ethylhexoxy) silane.

12. A process as defined in claim 1 wherein the olefin polymer is an alkylene-alkyl acrylate polymer and the unsaturated silane is vinyltrimethoxy silane or vinyltris-(2-ethylhexoxy) silane.

13. A process as defined in claim 1 wherein the alkylene-alkyl acrylate polymer is an ethylene-ethyl acrylate polymer.

14. A process as defined in claim 1 wherein the organic peroxide is di-α-cumyl peroxide.

15. A process as defined in claim 1 wherein the gas generating compound is azodicarbonamide.

16. A process as defined in claim 1 wherein the gas generating compound is p,p'-oxybis(benzenesulfonylhydrazide).

17. A process as defined in claim 1 wherein the composition contains trimethylol propane triacrylate.

18. A process as defined in claim 1 wherein the composition contains azodicarbonamide and p,p'-oxybis(benzenesulfonylhydrazide) as the gas generating compound.

19. A process as defined in claim 1 wherein the composition contains a silanol condensation catalyst.

20. A process as defined in claim 1 wherein the composition contains trimethylol propane triacrylate and p,p'-oxybis-(benzene sulfonyl hydrazide).

21. A process as defined in claim 20 wherein the composition contains a diene rubber.

* * * * *